United States Patent
Hsu et al.

(10) Patent No.: US 12,499,157 B2
(45) Date of Patent: Dec. 16, 2025

(54) AUTOMATICALLY GENERATING CONTEXT-BASED RESPONSES TO NATURAL LANGUAGE QUERIES USING KNOWLEDGE GRAPHS

(71) Applicant: Dell Products L.P., Round Rock, TX (US)

(72) Inventors: Avril W. Hsu, Dublin, CA (US); Jingyi Geng, Bellaire, TX (US); Sarthak Kapoor, Austin, TX (US); Nicholas Thompson, Hutto, TX (US)

(73) Assignee: Dell Products L.P., Round Rock, TX (US)

( * ) Notice: Subject to any disclaimer, the term of this patent is extended or adjusted under 35 U.S.C. 154(b) by 60 days.

(21) Appl. No.: 18/384,048

(22) Filed: Oct. 26, 2023

(65) Prior Publication Data

US 2025/0139168 A1 May 1, 2025

(51) Int. Cl.
*G06F 16/90* (2019.01)
*G06F 16/9032* (2019.01)

(52) U.S. Cl.
CPC .............. *G06F 16/90332* (2019.01)

(58) Field of Classification Search
CPC ................................. G06F 16/90332
See application file for complete search history.

(56) References Cited

U.S. PATENT DOCUMENTS

| 9,679,558 B2 | 6/2017 | Akbacak et al. | |
| 2019/0354544 A1* | 11/2019 | Hertz | G06N 5/025 |
| 2021/0334328 A1* | 10/2021 | Zolotow | G06F 16/24578 |
| 2022/0075948 A1* | 3/2022 | Yuan | G06N 20/00 |
| 2022/0100800 A1* | 3/2022 | Georgopoulos | G06F 16/3344 |
| 2022/0253477 A1* | 8/2022 | Lipka | G06N 20/00 |
| 2022/0335046 A1* | 10/2022 | Oshio | G06F 16/93 |
| 2023/0081540 A1* | 3/2023 | Bharitkar | G06F 40/20 706/12 |
| 2023/0169361 A1* | 6/2023 | Mitra | G06N 3/006 706/12 |

(Continued)

FOREIGN PATENT DOCUMENTS

| CN | 106462608 B | 2/2017 |
| JP | 7250052 B2 | 3/2022 |
| KR | 102514434 B1 | 3/2023 |

*Primary Examiner* — Mohammad S Rostami
(74) *Attorney, Agent, or Firm* — Ryan, Mason & Lewis, LLP

(57) ABSTRACT

Methods, apparatus, and processor-readable storage media for automatically generating context-based responses to natural language queries using knowledge graphs are provided herein. An example computer-implemented method includes generating at least one query in a predetermined query language by processing at least one natural language query of at least one user of an enterprise; generating a first set of results by processing the at least one query in the predetermined query language using one or more data sources including at least one enterprise-related knowledge graph; generating a second set of results by processing the at least one natural language query using one or more artificial intelligence techniques; generating a third set of results by incorporating at least a portion of the first set into at least a portion of the second set; and performing automated actions based on the third set of results.

20 Claims, 10 Drawing Sheets

(56) References Cited

U.S. PATENT DOCUMENTS

| | | | |
|---|---|---|---|
| 2023/0274322 A1* | 8/2023 | Copeland | G06Q 30/016 705/346 |
| 2023/0281467 A1* | 9/2023 | Eavy | G06F 16/9024 706/46 |
| 2023/0281468 A1* | 9/2023 | Eavy | G06N 5/02 706/46 |
| 2023/0418868 A1* | 12/2023 | Seonwoo | G06F 16/313 |
| 2024/0184829 A1* | 6/2024 | Roy | G06F 16/243 |
| 2024/0193667 A1* | 6/2024 | Pesaranghader | G06Q 30/0631 |
| 2024/0248878 A1* | 7/2024 | Abhyankar | G06F 16/1734 |
| 2024/0290435 A1* | 8/2024 | Desai | G16B 45/00 |
| 2024/0296352 A1* | 9/2024 | Yanosy, Jr. | G06N 5/02 |

* cited by examiner

| Collective Decision Intelligence | Search |

Key Metrics Quarterly Overview

| Sales Pipeline Velcoity | Sales Conversion Rate | Customer Acquisition Cost | Average Deal Size |
| xxx | xx% | $xxxx | $xxx |

View More ▼

Recommendations  Ask me questions

[Sales Pipeline Velocity Decline Root Cause] [Sales Conversion Rate Decline Root Cause]

Delayed Response Times
Customer Service Limited Resource
Poor Communication
Sales Pipeline Velocity Decline
Order Processing

Order Processing Analysis and Top Reasons

Average Time (minute) in Past 3 Quarters

Manual Processor
Account for Time Delay 55%
Account for Error increase 65%
Learn More Errors in Past 3 Quarters Supply Chain Issues
Account for Time Delay 25%
Account for Error increase 35%
Learn More

| Collective Decision Intelligence | Search |

Key Metrics Quarterly Overview

| Technology Budget $xxx | Technology Return on Investment (ROI) $xxxx | Automation Progress 52% | CSAT Score 70% |

View More ▼

Recommendations | What areas of the metaverse are still gaining traction |

[Metaverse Market and Trend Analysis] [Metaverse Technology Trends]

Market Development
Evolution Of Products And Services — Key Drivers
Metaverse Market And Trends
Metaverse And Digital Twins   Opportunities   Market Share By Region Opportunities for Enterprise in Metaverse Market Projected revenue(s) in the meataverse hardware market

[Learn More]

Strategic Metaverse Objectives for Tech Product Leaders
• Build metaverse products and solutions
• Identify metaverse-inspired opportunities
• Prepare for business model transformation

[Learn More]

Collective Decision Intelligence          Search

Key Metrics Quarterly Overview

| Compliance Audit | Regulatory Fines and Penalties | Employee Compliance Training | Contracts Reviewed |
|---|---|---|---|
| 243 o— | $XXXX o— | 56% o— | 78% o— |

View More ▼

Recommendations — What are some unique legal challenges and consideration specific to intellectual property (IP) rights and user generated content in the metaverse

- Compliance With International IP Laws
- Scope Of IP For Virtual Goods
- Product Stack
- Juridiction And Governing Law
- Digital Identity
- Ownership Of Virtual Assests
- Data Privacy And Security

Top 3 Legal Challenges for Metaverse

| Ownership of virtual assests | Scope of IP for virtual goods | Ensure compliance with international IP laws |
|---|---|---|
| Learn More | Learn More | Learn More |

AUTOMATICALLY GENERATING CONTEXT-BASED RESPONSES TO NATURAL LANGUAGE QUERIES USING KNOWLEDGE GRAPHS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

From product conception to product launch, enterprises commonly rely on informed insights and knowledge sharing to make strategic product-related decisions. However, due at least in part to geographic variability, as well as changes in market dynamics and/or technologies, challenges exist with respect to enterprise product-related communication across languages and platforms despite increasing temporal pressures. Conventional communication management approaches typically include using techniques which do not perform well with respect to natural language understanding and/or with respect to generalizing complex queries, often leading to errors and resource-intensive delays.

SUMMARY

Illustrative embodiments of the disclosure provide techniques for automatically generating context-based responses to natural language queries using knowledge graphs in combination with artificial intelligence techniques.

An exemplary computer-implemented method includes generating at least one query in a predetermined query language by processing at least one natural language query of at least one user of an enterprise. The method also includes generating a first set of results by processing the at least one query in the predetermined query language using one or more data sources including at least one enterprise-related knowledge graph, generating a second set of results by processing the at least one natural language query using one or more artificial intelligence techniques, and generating a third set of results by incorporating at least a portion of the first set of results into at least a portion of the second set of results. Further, the method additionally includes performing one or more automated actions based at least in part on the third set of results.

Illustrative embodiments can provide significant advantages relative to conventional communication management approaches. For example, problems associated with errors and resource-intensive delays are overcome in one or more embodiments through automatically generating enterprise-specific responses to natural language queries using enterprise-related knowledge graphs in combination with artificial intelligence techniques.

These and other illustrative embodiments described herein include, without limitation, methods, apparatus, systems, and computer program products comprising processor-readable storage media.

BRIEF DESCRIPTION OF THE DRAWINGS

FIG. 6 shows an example interface view in connection with a collaborative intelligence engine in an illustrative embodiment.

FIG. 7 shows an example interface view in connection with a collaborative intelligence engine in an illustrative embodiment.

FIG. 8 shows an example interface view in connection with a collaborative intelligence engine in an illustrative embodiment.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
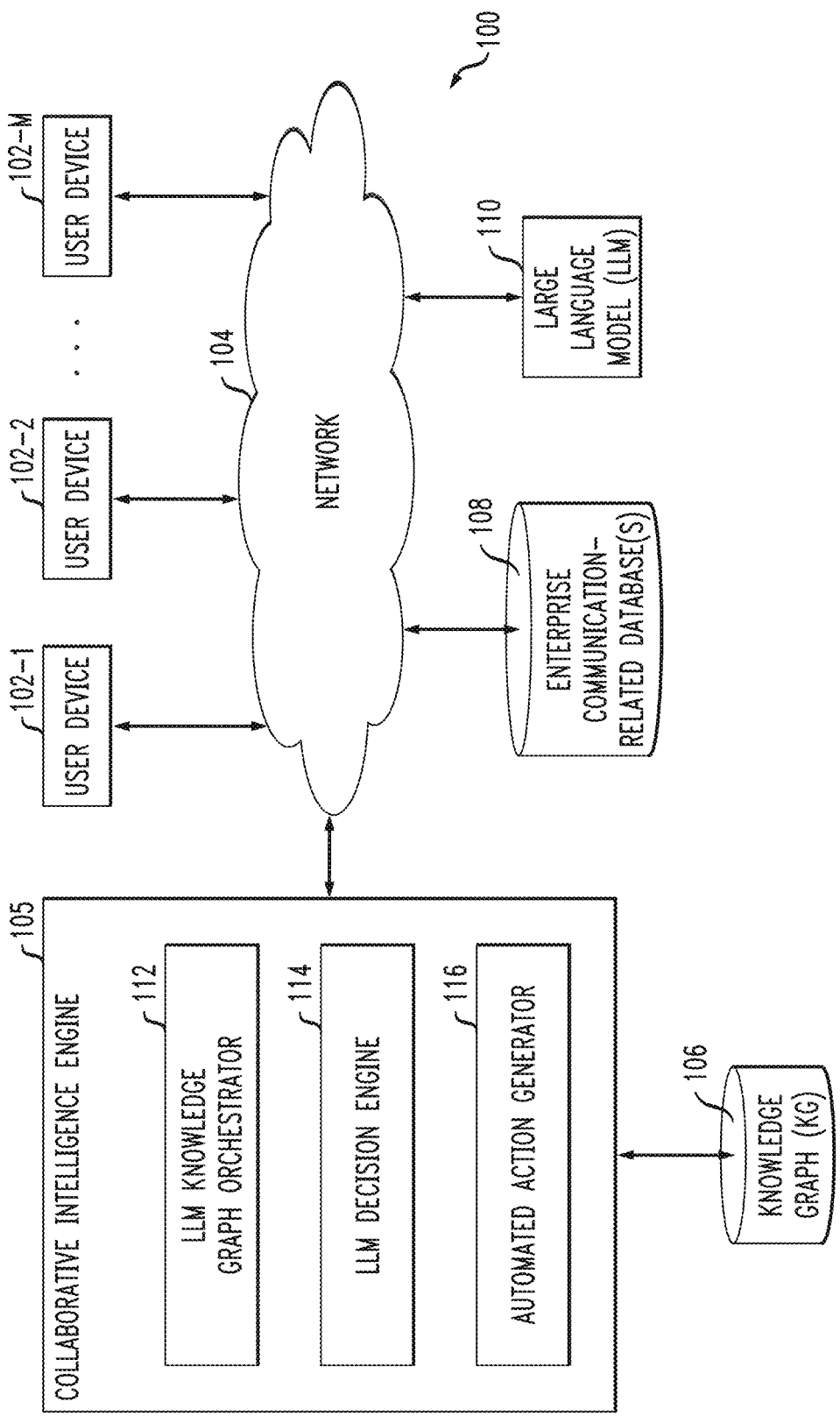
FIG. 1 shows an information processing system configured for automatically generating context-based responses to natural language queries using knowledge graphs in combination with artificial intelligence techniques in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is at least one LLM 110, one or more enterprise communication-related databases 108, and collaborative intelligence engine 105, which can be coupled to one or more knowledge graphs 106.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, collaborative intelligence engine 105 can have one or more associated enterprise communication-related databases 108 configured to store data pertaining to various platforms and/or applications which can be used by various users and/or systems within an enterprise in connection with one or more tasks.

Further, as depicted in FIG. 1 and detailed herein, collaborative intelligence engine 105 can have one or more associated knowledge graphs 106 which include and/or store structured data sources that represent and/or illustrate at least one network of entities (e.g., enterprise-related entities) and relationships between and/or among them.

The enterprise communication-related database(s) 108 and/or knowledge graph(s) 106 in the present embodiment is implemented using one or more storage systems associated with collaborative intelligence engine 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with collaborative intelligence engine 105 are one or more input-output devices, which illustratively comprise keyboards, displays or other types of input-output devices in any combination. Such input-output devices can be used, for example, to support one or more user interfaces to collaborative intelligence engine 105, as well as to support communication between collaborative intelligence engine 105 and other related systems and devices not explicitly shown.

Additionally, collaborative intelligence engine 105 in the FIG. 1 embodiment is assumed to be implemented using at least one processing device. Each such processing device generally comprises at least one processor and an associated memory, and implements one or more functional modules for controlling certain features of collaborative intelligence engine 105.

More particularly, collaborative intelligence engine 105 in this embodiment can comprise a processor coupled to a memory and a network interface.

The processor illustratively comprises a microprocessor, a central processing unit (CPU), a graphics processing unit (GPU), a tensor processing unit (TPU), a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows collaborative intelligence engine 105 to communicate over the network 104 with the user devices 102, and illustratively comprises one or more conventional transceivers.

The collaborative intelligence engine 105 further comprises LLM knowledge graph orchestrator 112, LLM decision engine 114, and automated action generator 116.

It is to be appreciated that this particular arrangement of elements 112, 114 and 116 illustrated in the collaborative intelligence engine 105 of the FIG. 1 embodiment is presented by way of example only, and alternative arrangements can be used in other embodiments. For example, the functionality associated with elements 112, 114 and 116 in other embodiments can be combined into a single module, or separated across a larger number of modules. As another example, multiple distinct processors can be used to implement different ones of elements 112, 114 and 116 or portions thereof.

At least portions of elements 112, 114 and 116 may be implemented at least in part in the form of software that is stored in memory and executed by a processor.

It is to be understood that the particular set of elements shown in FIG. 1 for automatically generating context-based responses to natural language queries using knowledge graphs in combination with artificial intelligence techniques involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, two or more of collaborative intelligence engine 105, enterprise communication-related database(s) 108, LLM 110, and knowledge graph(s) 106 can be on and/or part of the same processing platform.

An exemplary process utilizing elements 112, 114 and 116 of an example collaborative intelligence engine 105 in computer network 100 will be described in more detail with reference to the flow diagram of FIG. 9.

Accordingly, at least one embodiment includes generating and/or implementing a collaborative intelligence engine, which includes the use of at least one LLM and at least one knowledge graph, for combinational decision making (e.g., in connection with emerging time-to-market challenges). In an example embodiment, at least one knowledge graph is layered on top of one or more LLMs (such as, e.g., generative pretrained transformer 4 (GPT-4), Bidirectional Encoder Representations from Transformers (BERT), Robustly Optimized BERT Approach (RoBERTa), Text-to-Text Transfer Transformer (T5), etc.) to enable seizing emerging user needs for collaborative intelligence from product conception to product launch.

Additionally, one or more embodiments include generating and/or implementing a modular reasoning knowledge and language (MRKL) agent that will utilize one or more ontologies (e.g., a given enterprise ontology) to construct federated queries in one or more query languages (e.g., SparQL, structured query language (SQL), etc.) to be processed across one or more data sources. As used herein in connection with one or more embodiments, collaborative intelligence engine (such as, for example, element 105 in FIG. 1) can include a MRKL, which can comprise a modular architecture that combines one or more LLMs, external knowledge sources and discrete reasoning. Such a MRKL can also include, e.g., one or more tools, an LLMChain that produces text that is parsed in a certain way to determine which action(s) to take, and an agent class which parses output of the LLMChain to determine which action(s) to take.

Referring again to the above-noted federated queries, the results of such queries can then be incorporated with LLM results to produce contextual and accurate responses to user queries. For example, in one or more embodiments, at least a portion of the data source results serve as the context and the most relevant results are appended to at least one of the user queries.

As further detailed herein, at least one embodiment includes enabling and/or allowing users without deep domain knowledge or significant technical knowledge to organically search, explore, and/or query knowledge graphs using natural language, and make decisions based at least in part on the responses to such queries.

Figure 2:
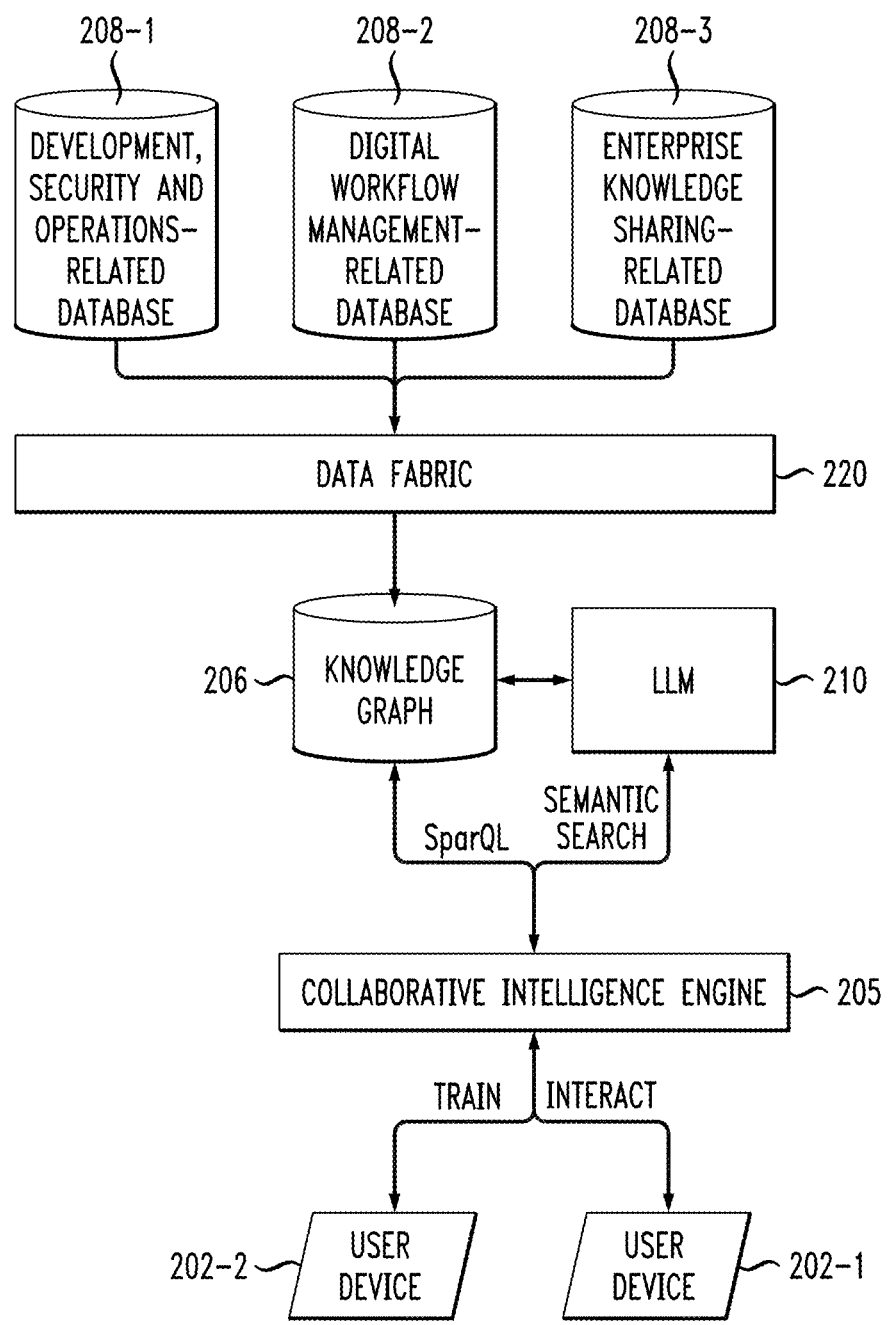
FIG. 2 shows an example workflow implementing a collaborative intelligence engine in an illustrative embodiment.

FIG. 2 shows an example workflow implementing the collaborative intelligence engine in an illustrative embodiment. By way of illustration, FIG. 2 depicts data fabric 220 being fed and/or provided with enterprise-specific data (e.g., product data, application programming interfaces (APIs), services data, documentation, etc.) from various databases including, e.g., development, security, and operations-related database 208-1, digital workflow management-related database 208-2, and enterprise knowledge sharing-related database 208-3. As used herein, data fabric 220 includes an architecture that facilitates end-to-end integration of various data pipelines and/or cloud environments. Additionally, data fabric 220 is used to build and/or update an enterprise-specific ontology and knowledge graph 206 from the connected data sources (i.e., databases 208-1, 208-2, and 208-3).

Further, as depicted in FIG. 2, enterprise subject matter experts (SMEs), via user device 202-2, can train at least a portion of collaborative intelligence engine 205 using an internal training platform that utilizes at least one LLM. Also, at least one cross-functional user, via user device 202-1, can both explore enterprise domain knowledge and interact with the enterprise domain knowledge using collaborative intelligence engine 205 to gain one or more insights and build one or more solutions. Relatedly, and as further detailed herein, an abstraction layer incorporated into collaborative intelligence engine 205 allows natural language (such as provided by a user in the form of a user query) to be parsed into one or more cypher queries which are then processed against knowledge graph 206 and/or LLM 210, allowing non-technical users to explore and interact with enterprise domain knowledge. In at least one example embodiment, LLM 210 can be implemented to convert a natural language query into a query of a given query language (e.g., a SparQL query, a cypher query, an SQL query, etc.), which can then be run against knowledge graph 206 to retrieve relevant information.

Figure 3:
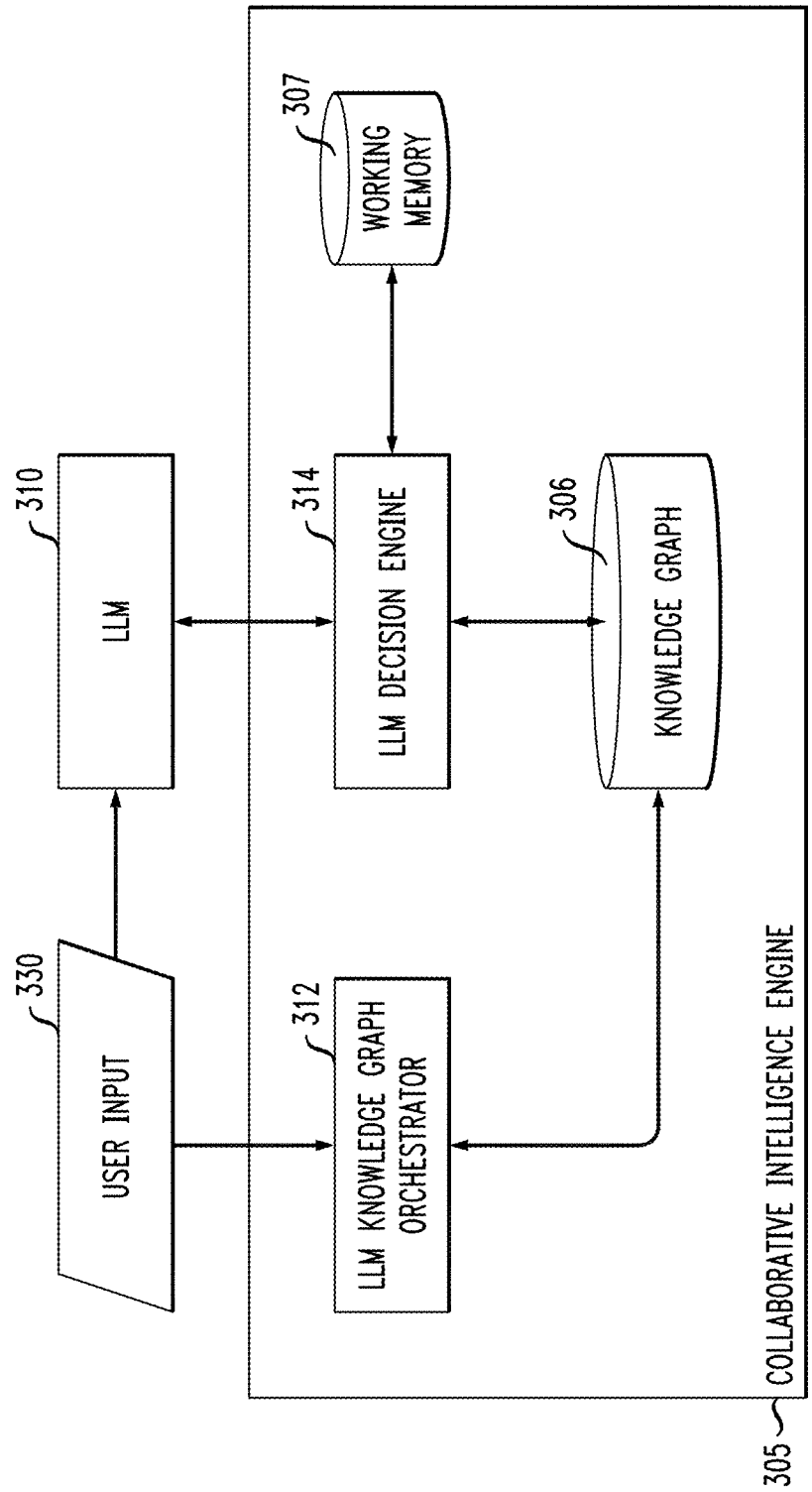
FIG. 3 shows an example workflow implementing a collaborative intelligence engine in an illustrative embodiment.

FIG. 3 shows an example workflow implementing the collaborative intelligence engine 305 in an illustrative embodiment. By way of illustration, FIG. 3 depicts user input 330 (e.g., a user query) being provided to LLM knowledge graph orchestrator 312 as well as to LLM 310. Additionally, within collaborative intelligence engine 305, LLM knowledge graph orchestrator 312 uses at least a portion of the user input 330 to build and/or update knowledge graph 306 (which can be, e.g., specific to an enterprise associated with the user input 330). At least a portion of knowledge graph 306 can then be used and/or processed by LLM decision engine 314, in conjunction with data from working memory 307, to generate at least one enterprise-specific output to LLM 310, which will use at least a portion of such output to process the user input 330. Such data stored within working memory 307 can include, e.g., user-relevant data to provide context such as past search history, past search results etc.

Figure 4:
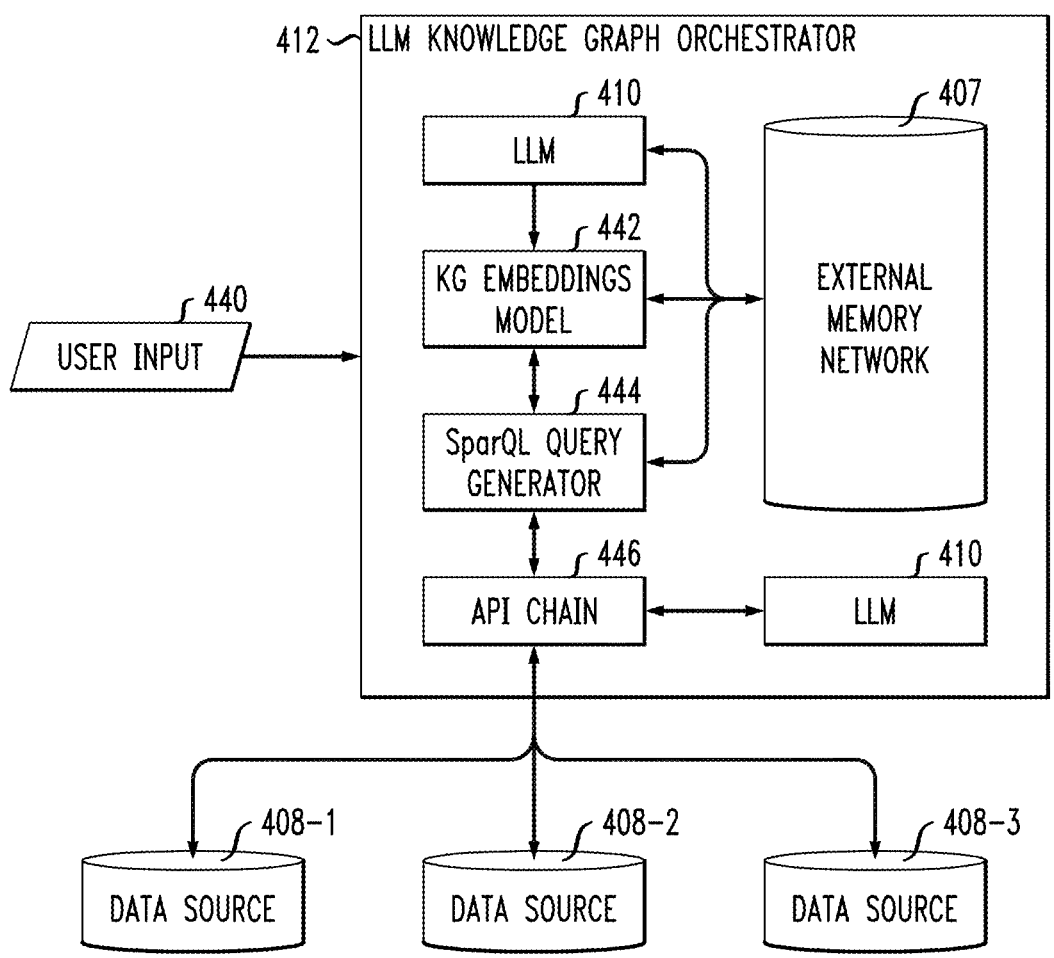
FIG. 4 shows an example workflow implementing a large language model (LLM) knowledge graph orchestrator in an illustrative embodiment.

FIG. 4 shows an example workflow implementing an LLM knowledge graph orchestrator in an illustrative embodiment. By way of illustration, FIG. 4 depicts LLM knowledge graph orchestrator 412, which includes knowledge graph (KG) embeddings model 442, external memory network 407, SparQL query generator 444, API chain 446 (which can include an abstraction layer which obtains and parses data), and LLM 410. In one or more embodiments, the two instances of LLM 410 illustrated in FIG. 4 represent the same LLM (e.g., an LLM fine-tuned on a specific enterprise ontology) and illustrated twice for ease of visualization. In one or more embodiments, SparQL query generator 444 can include and/or provide extensions to query syntax for executing distributed queries over any number of SparQL endpoints. Such a feature allows integration of resource description framework (RDF) data from different sources using a single query, which simplifies integrating and querying a complex enterprise data topology.

As further detailed herein, an example embodiment such as depicted in FIG. 4 can include augmenting knowledge graph data returned from a SparQL query with an LLM user response and semantic search. As used herein, semantic search refers to a type of search that incorporates and/or focuses on the searcher's intent and/or search context. Accordingly, such an embodiment can include embedding data that is being considered into a vector space, and when the search is being performed, the query is embedded into the same vector space and the closest embeddings from a given corpus are returned. As such, a semantic search can start by tokenizing any text input and then passing the tokens through a pretrained embedding model which vectorizes each piece of text. Once the data are vectorized, the data can be indexed, and during search time, a user's input query can be vectorized in the same way. Then, using the index, such an embodiment can include finding the closest results to the query, and to determine which vectors are closest to the input vector, techniques such as, e.g., cosine similarity and/or approximate near can be used.

Also, at least one embodiment includes utilizing at least one enterprise-specific ontology to construct one or more federated SparQL queries that will then query across multiple data sources such as, for example, data source 408-1, data source 408-2, and data source 408-3 depicted in FIG. 4 (e.g., data sources such as customer relationship management data sources, user collaboration data sources, software management data sources, issue tracking data sources, etc.). The results of such querying will then be incorporated with the LLM results of processing the same one or more queries and/or one or more corresponding natural language queries to produce highly contextual and accurate responses to the queries.

Referring again to FIG. 4, LLM architecture can be extended using external memory network 407. Specifically, one or more embodiments include integrating external memory network 407 with LLM 410, wherein external memory network 407 serves as a knowledge base that stores structured data from one or more knowledge graphs (e.g., conversation history and enterprise ontology information to be accessed during inference). The external memory network 407 can use one or more attention mechanisms to read and write to memory, allowing the LLM 410 to selectively access relevant information during inference. Additionally, the external memory network 407 can be used at least in part to train knowledge graph embeddings model 442. In one or more embodiments, such a knowledge graph embeddings model 442 can include a pretrained LLM fine-tuned on natural language and SparQL pairs specific and/or relevant to the given knowledge graph. Further, in connection with processing user input 440 (e.g., a user query) LLM 410 can enrich the user input 440 with data from external memory network 407 and/or general knowledge.

As noted above, at least one embodiment includes training knowledge graph embeddings model 442 to map entities and relations from one or more knowledge graphs into at least one continuous vector space. This enables the LLM 410 to work with structured data by converting such data into a form that can be integrated with a neural representation. Additionally, one or more embodiments include incorporating, using knowledge graph embeddings model 442, one or more knowledge graph embeddings into LLM 410 by modifying the LLM's architecture to accept and utilize the embeddings generated by the knowledge graph embeddings model 442.

Also, inputs from external memory network 407 and/or knowledge graph embeddings model 442 can be used to train at least a portion of SparQL query generator 444. For example, in at least one embodiment, such inputs can be used to train a sequence-to-sequence (seq2seq) model, within SparQL query generator 444, that can take user input 440 and LLM context as input and generate a SparQL query template with one or more placeholders for entities and/or relations. Such an embodiment also includes filling the placeholders in the SparQL query template with identified entities and/or relations from the external memory network 407 and/or knowledge graph embeddings model 442, and subsequently executing the query against at least one knowledge graph via API chain 446.

By way of further illustration of one or more embodiments, consider an example use case in which quarterly customer satisfaction (CSAT) scores for a given enterprise division show a noticeable drop due to recent economic conditions. A given sales employee (User1) of the enterprise had already lowered projections going into the next fiscal year, and will need to find a new way to pivot if given projected values are to be satisfied. Accordingly, User1 and User1's team may attempt to determine the source of the CSAT drop and implement a solution in time to meet the given projected values.

Figure 5:
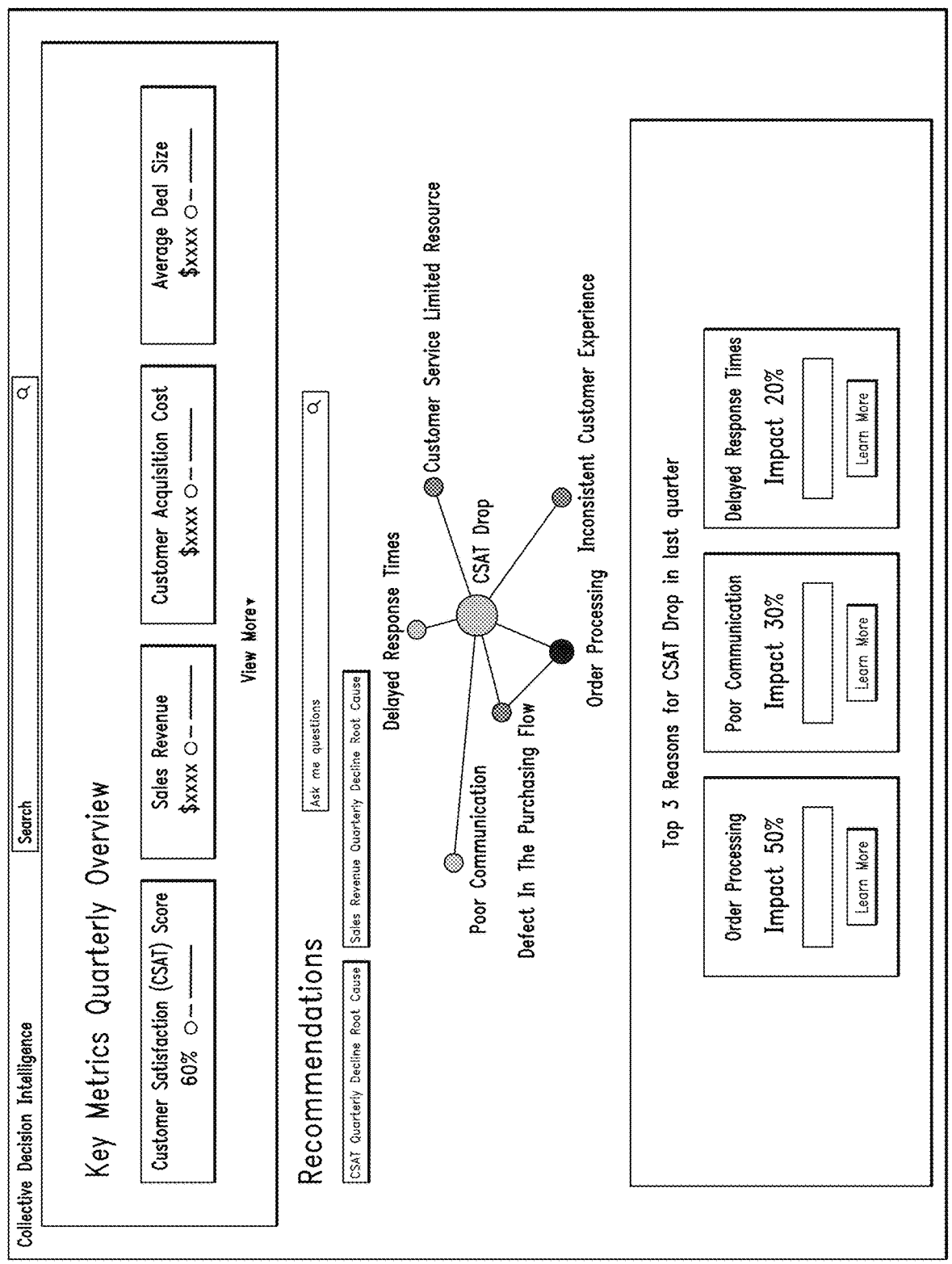
FIG. 5 shows an example interface view in connection with a collaborative intelligence engine in an illustrative embodiment.

As such, in connection with an example embodiment, User1 queries a collaborative intelligence engine as follows: "What are the key factors contributing to the decline in our CSAT scores and sales?" The collaborative intelligence engine, such as detailed herein, can return a detailed analysis, such as illustrated in FIG. 5, highlighting that delayed response times, poor communication, and order processing are major contributors. Accordingly, FIG. 5 shows an example interface view 500 in connection with a collaborative intelligence engine in an illustrative embodiment. User1 can then leverage such analysis performed by the collaborative intelligence engine to determine and/or identify one or more insights relevant to a decision chain associated with the problem(s) at hand. For example, User1 can message a data scientist on the team (User2) and ask the data scientist to investigate the analysis into order processing (e.g., as this area may likely be quickest to optimize).

User2 can then query the collaborative intelligence engine as follows: "Can you compare this quarter against the last three quarters and identify downward trends in order processing time, error rates as well as extract entities and themes from customer complaints? Please also aggregate features and rank accordingly." The collaborative intelligence engine then returns a list of the top order processing features impacting CSAT scores, such as illustrated in FIG. 6. Accordingly, FIG. 6 shows an example interface view 600 in connection with a collaborative intelligence engine in an illustrative embodiment. User2 can then utilize the collaborative intelligence engine output to push the decision forward. For example, User 2 can present, to the team, a list of features and additional analysis pertaining to order processing issues and actions related to ameliorating and/or optimizing such issues.

Further, such an example use case can additionally include a senior account executive (User3) who observes, in User2's provided materials, several features in order processing which relate to shipping processes. User2 then queries the collaborative intelligence engine as follows: "The order processing times are slow and I need to find a way to optimize. Are there any solutions that would help me speed up the process?" The collaborative intelligence engine then suggests that the enterprise's automation team can implement several bots in order processing, including data entry and generation of packing slips. User3 continues to query the collaborative intelligence engine to find details about the bots as well as who to reach out to and what information will be needed for implementing the bots.

Also, an automation engineer (User4), after communicating with User3, generates one or more lists of parameters and provides the same to the collaborative intelligence engine and queries the collaborative intelligence engine to generate the template file to be used to load into their packing slip bot. The collaborative intelligence engine responds with the fully generated template code needed for User4 to clone the bot specifically for User3's use case. User4 can then check the code and load the code into the given cloned automation mechanism.

By way of further illustration of one or more embodiments, consider another example use case in which adoption of metaverse technologies has accelerated an enterprise seeks to pivot and solidify offerings in the virtual reality space. In such an example use case, the enterprise chief technology officer (UserA) queries a collaborative intelligence engine as follows: "Given a current economic downturn, what areas of the metaverse are gaining traction and how would the enterprise position itself to get market share in this space?" The collaborative intelligence engine returns, as illustrated in FIG. 7, a list of trends as well as insights as to how the enterprise could position itself in the market. Accordingly, FIG. 7 shows an example interface view 700 in connection with a collaborative intelligence engine in an illustrative embodiment. UserA is able to leverage the analysis by the collaborative intelligence engine to construct at least one high-level concept. For example, UserA can arrive on a Metaverse-as-a-Service offering which can leverage the enterprise's high performance hardware and end-to-end services to make a fully managed product.

UserA then passes the overall concept to marketing and engineering to build out a concept, wherein an engineering director (UserB) can query the collaborative intelligence engine as follows: "What hardware stack would be ideal to build a modern virtual reality infrastructure?" The collaborative intelligence engine then returns a list of enterprise products optimized for virtual reality. After some additional analysis, a list of configuration options at different price points can be generated. As such, UserB can subsequently send a document with detailed information on the configurations and hardware specifications to the enterprise marketing team.

A member of the marketing team (UserC) then queries the collaborative intelligence engine as follows: "Please build out copy for a marketing page for the enterprise's new product offering 'Metaverse-as-a-Service.' Please call out enterprise differentiators wherever possible." The collaborative intelligence engine returns one or more taglines and differentiators for one or more sections of a main landing web page, and UserC collaborates with the rest of the marketing team and brand to refine the copy and pull any necessary images. Additionally, UserC can subsequently communicate such information to an enterprise designer (UserD) and an enterprise engineer (UserE), who collaborate, upload a wireframe with the copy and images to the collaborative intelligence engine and query the engine to build out the web page using the enterprise design system. The collaborative intelligence engine then returns a fully coded web page with a few minor mistakes, and UserD and UserE work to make final modifications and fix the minor mistakes. The updated and/or finalized web page and configuration options are then sent to the enterprise legal team for review.

An enterprise legal team member (UserF) then queries the collaborative intelligence engine as follows: "What are some legal challenges and considerations specific to intellectual property rights and user-generated content in the metaverse?" The collaborative intelligence engine responds that ownership of virtual assets, scope of intellectual property rights for virtual goods, and ensuring compliance with international intellectual property laws are important considerations, as illustrated in FIG. 8. Accordingly, FIG. 8 shows an example interface view 800 in connection with a collaborative intelligence engine in an illustrative embodiment. UserF can then utilize such outputs of the collaborative intelligence engine to render a holistic view of legal considerations in response to the market, as well as use the collaborative intelligence engine outputs to explore current legal trends and best practices and create a new enterprise terms of service agreement specifically for the metaverse.

It is to be appreciated that some embodiments described herein utilize one or more artificial intelligence models. It is to be appreciated that the term "model," as used herein, is intended to be broadly construed and may comprise, for example, a set of executable instructions for generating computer-implemented recommendations and/or predictions. For example, one or more of the models described herein may be trained to generate recommendations and/or predictions based on enterprise-specific ontologies and/or knowledge graphs in conjunction with LLM processing, and such recommendations and/or predictions can be used to initiate one or more automated actions (e.g., generating and outputting highly contextual responses to natural language user queries, automatically training artificial intelligence techniques associated with generating such responses, etc.).

Figure 9:
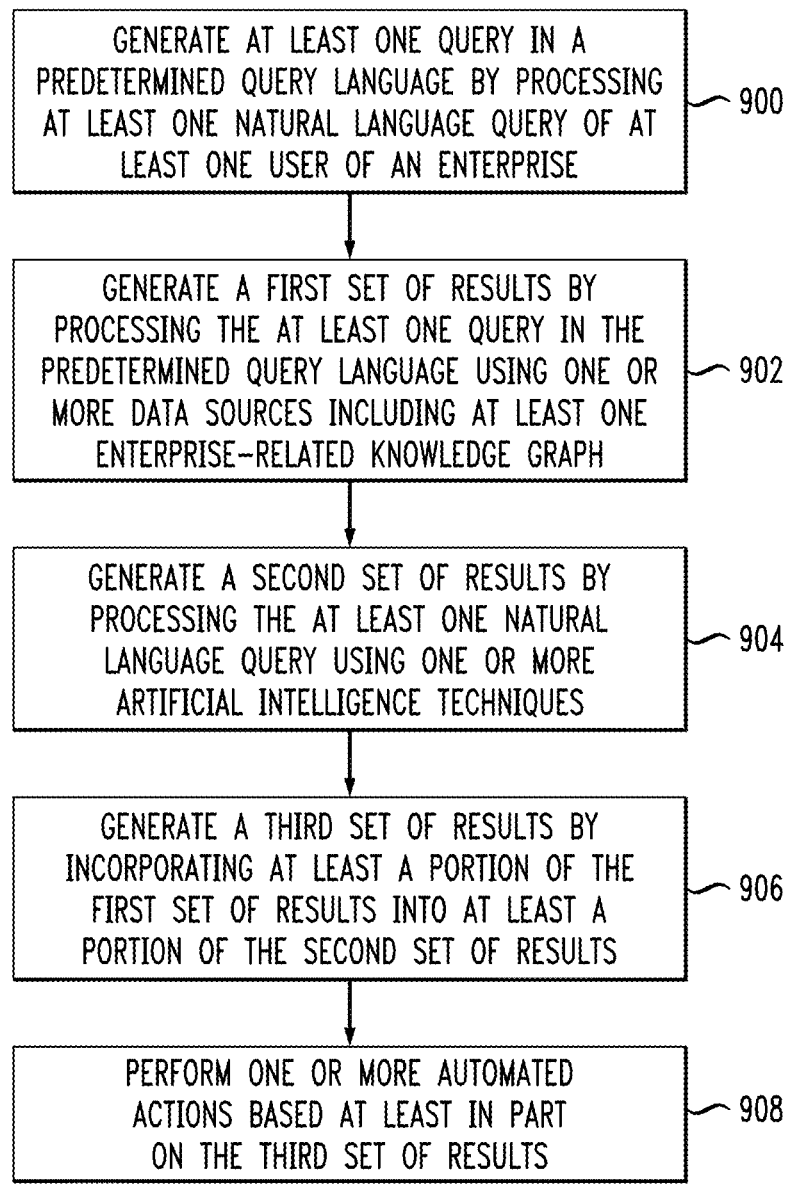
FIG. 9 is a flow diagram of a process for automatically generating context-based responses to natural language queries using knowledge graphs in combination with artificial intelligence techniques in an illustrative embodiment.

FIG. 9 is a flow diagram of a process for automatically generating context-based responses to natural language queries using knowledge graphs in combination with artificial intelligence techniques in an illustrative embodiment. It is to be understood that this particular process is only an example, and additional or alternative processes can be carried out in other embodiments.

In this embodiment, the process includes steps 900 through 908. These steps are assumed to be performed by collaborative intelligence engine 105 utilizing elements 112, 114 and 116.

Step 900 includes generating at least one query in a predetermined query language by processing at least one natural language query of at least one user of an enterprise. In at least one embodiment, generating the at least one query in the predetermined query language includes processing the at least one natural language query using one or more natural language processing techniques. In such an embodiment, processing the at least one natural language query using one or more natural language processing techniques can include processing the at least one natural language query using at least one seq2seq model.

In one or more embodiments, generating the at least one query in the predetermined query language includes generating at least one query in a given query language (e.g., a SparQL query), with one or more placeholders for at least one of one or more entities and one or more relations, by processing the at least one natural language query using one or more natural language processing techniques. Such an embodiment also includes filling the one or more placeholders using at least one knowledge graph embedding model, wherein the at least one knowledge graph embedding model is trained to map one or more entities and one or more relations from one or more enterprise-related knowledge graphs into at least one continuous vector space.

Step 902 includes generating a first set of results by processing the at least one query in the predetermined query language using one or more data sources including at least one enterprise-related knowledge graph. Step 904 includes generating a second set of results by processing the at least one natural language query using one or more artificial intelligence techniques. In one or more embodiments, generating the second set of results includes processing the at least one natural language query using at least one LLM. In such an embodiment, reinforcement learning from human feedback (RLHF) can be applied in pretraining of the at least one LLM (e.g., ChatGPT, LLama2, etc.). Additionally or alternatively, in one or more embodiments, the same LLM can be used in step 900 and step 904. In such an embodiment, the LLM generates a cypher query to start, and also processes a natural language query with appended context information and puts the response in a human readable format.

Additionally, in one or more embodiments, the one or more artificial intelligence techniques comprise at least one pretrained LLM, and such an embodiment further includes fine-tuning the at least one pretrained LLM using data specific to at least one ontology of the enterprise (e.g., by leveraging Hugging Face and Py torch libraries such that the LLM is better adapted to the particular enterprise ontology (for example, by prioritizing and/or weighting text data that describes various organizations within the enterprise, text data that pertains to various enterprise products, text data that discusses various enterprise initiatives and/or abbreviations, etc.).

Step 906 includes generating a third set of results by incorporating at least a portion of the first set of results into at least a portion of the second set of results. In at least one embodiment, generating the third set of results includes augmenting at least a portion of the first set of results, generated by processing at least one SparQL query using data associated with the at least one enterprise-related knowledge graph, with at least a portion of the second set of results, generated by processing the at least one natural language query using at least one LLM, and results from at least one semantic search operation. Additionally or alternatively, generating the third set of results can include integrating at least one external memory network into the one or more artificial intelligence techniques, wherein the at least one external memory network includes at least one enterprise-specific knowledge base that stores structured data from one or more enterprise-related knowledge graphs. In such an embodiment, the at least one external memory network can include one or more attention mechanisms to read and write to memory, enabling at least a portion of the one or more artificial intelligence techniques to selectively access information in the at least one external memory network.

Step 908 includes performing one or more automated actions based at least in part on at least a portion of the third set of results. In one or more embodiments, performing one or more automated actions includes automatically training at least a portion of the one or more artificial intelligence techniques using one or more of at least a portion of the third set of results and feedback related to the third set of results. Additionally or alternatively, performing one or more automated actions can include automatically outputting the third set of results to the at least one user via at least one interface.

Accordingly, the particular processing operations and other functionality described in conjunction with the flow diagram of FIG. 9 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to automatically generate context-based responses to natural language queries using knowledge graphs in combination with artificial intelligence techniques. These and other embodiments can effectively overcome problems associated with errors and resource-intensive delays.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 10 and 11. Although described in the context of system 100, these platforms may also be used to implement at least portions of other information processing systems in other embodiments.

Figure 10:
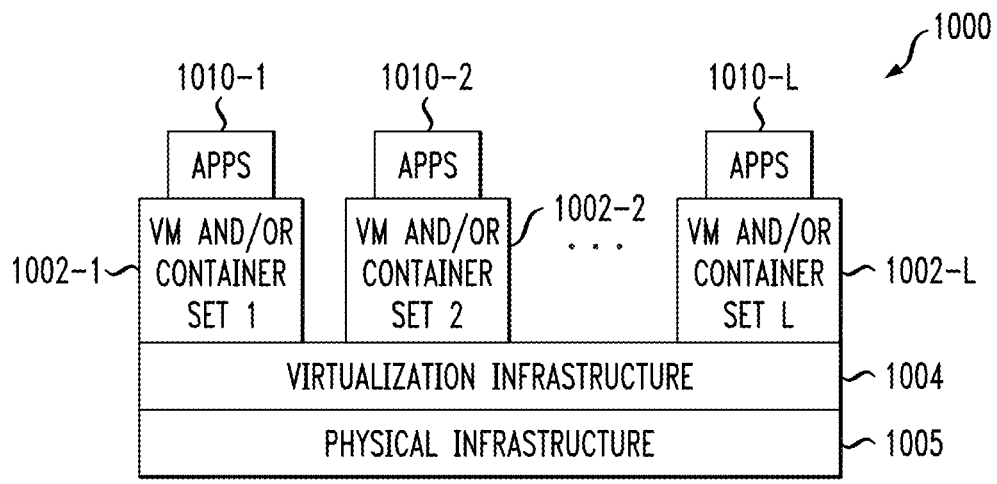
FIGS. 10 and 11 show examples of processing platforms that may be utilized to implement at least a portion of an information processing system in illustrative embodiments.
Figure 11:
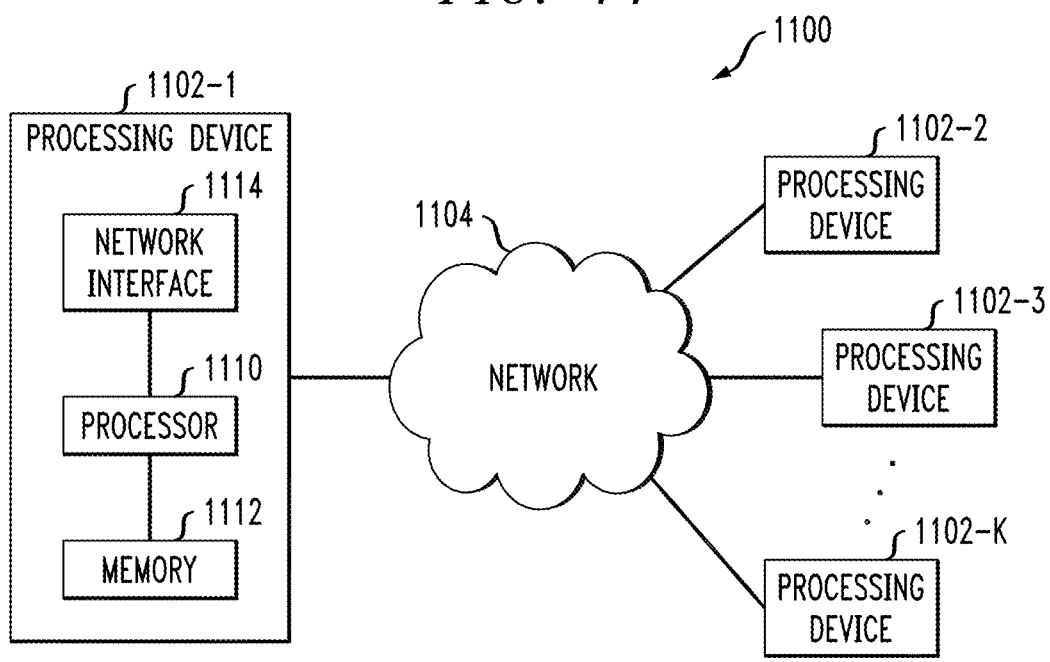

FIG. 10 shows an example processing platform comprising cloud infrastructure 1000. The cloud infrastructure 1000 comprises a combination of physical and virtual processing resources that are utilized to implement at least a portion of the information processing system 100. The cloud infrastructure 1000 comprises multiple virtual machines (VMs) and/or container sets 1002-1, 1002-2, . . . 1002-L implemented using virtualization infrastructure 1004. The virtualization infrastructure 1004 runs on physical infrastructure 1005, and illustratively comprises one or more hypervisors and/or operating system level virtualization infrastructure. The operating system level virtualization infrastructure illustratively comprises kernel control groups of a Linux operating system or other type of operating system.

The cloud infrastructure 1000 further comprises sets of applications 1010-1, 1010-2, 1010-L running on respective ones of the VMs/container sets 1002-1, 1002-2, . . . 1002-L under the control of the virtualization infrastructure 1004. The VMs/container sets 1002 comprise respective VMs, respective sets of one or more containers, or respective sets of one or more containers running in VMs. In some implementations of the FIG. 10 embodiment, the VMs/container sets 1002 comprise respective VMs implemented using virtualization infrastructure 1004 that comprises at least one hypervisor.

A hypervisor platform may be used to implement a hypervisor within the virtualization infrastructure 1004, wherein the hypervisor platform has an associated virtual infrastructure management system. The underlying physical machines comprise one or more information processing platforms that include one or more storage systems.

In other implementations of the FIG. 10 embodiment, the VMs/container sets 1002 comprise respective containers implemented using virtualization infrastructure 1004 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 1000 shown in FIG. 10 may represent at least a portion of one processing platform. Another example of such a processing platform is processing platform 1100 shown in FIG. 11.

The processing platform 1100 in this embodiment comprises a portion of system 100 and includes a plurality of processing devices, denoted 1102-1, 1102-2, 1102-3, . . . 1102-K, which communicate with one another over a network 1104.

The network 1104 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 1102-1 in the processing platform 1100 comprises a processor 1110 coupled to a memory 1112.

The processor 1110 comprises a microprocessor, a CPU, a GPU, a TPU, a microcontroller, an ASIC, a FPGA or other type of processing circuitry, as well as portions or combinations of such circuitry elements.

The memory 1112 comprises random access memory (RAM), read-only memory (ROM) or other types of memory, in any combination. The memory 1112 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1102-1 is network interface circuitry 1114, which is used to interface the processing device with the network 1104 and other system components, and may comprise conventional transceivers.

The other processing devices 1102 of the processing platform 1100 are assumed to be configured in a manner similar to that shown for processing device 1102-1 in the figure.

Again, the particular processing platform 1100 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of an information processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
generating at least one query in a predetermined query language by processing at least one natural language query of at least one user of an enterprise;
generating a first set of results by processing the at least one query in the predetermined query language using one or more data sources including at least one enterprise-related knowledge graph;
generating a second set of results by processing the at least one natural language query using one or more artificial intelligence techniques;
generating a third set of results by incorporating at least a portion of the first set of results into at least a portion of the second set of results, wherein generating the third set of results comprises extending an architecture of the one or more artificial intelligence techniques by:
integrating at least one external memory network and one or more attention mechanisms into the one or more artificial intelligence techniques, wherein the at least one external memory network comprises at least one enterprise-specific knowledge base that stores structured data from the at least one enterprise-related knowledge graph;
configuring the at least one external memory network to use at least a portion of the one or more attention mechanisms to read from and write to memory; and
configuring the one or more artificial intelligence techniques to selectively access information, associated with the use of the at least a portion of the one or more attention mechanisms, in the at least one external memory network; and
performing one or more automated actions based at least in part on at least a portion of the third set of results, wherein performing one or more automated actions comprises automatically training at least a portion of the one or more artificial intelligence techniques using at least a portion of the third set of results and feedback related to the third set of results;
wherein the method is performed by at least one processing device comprising a processor coupled to a memory.

2. The computer-implemented method of claim 1, wherein the one or more artificial intelligence techniques comprise at least one pretrained large language model, and wherein the computer-implemented method further comprises:
fine-tuning the at least one pretrained large language model using data specific to at least one ontology of the enterprise.

3. The computer-implemented method of claim 1, wherein generating the third set of results comprises augmenting at least a portion of the first set of results, generated by processing at least one SparQL query using data associated with the at least one enterprise-related knowledge graph, with at least a portion of the second set of results, generated by processing the at least one natural language query using at least one large language model, and results from at least one semantic search operation.

4. The computer-implemented method of claim 1, wherein performing one or more automated actions comprises automatically outputting the third set of results to the at least one user via at least one interface.

5. The computer-implemented method of claim 1, wherein generating the at least one query in the predetermined query language comprises processing the at least one natural language query using one or more natural language processing techniques.

6. The computer-implemented method of claim 5, wherein processing the at least one natural language query using one or more natural language processing techniques comprises processing the at least one natural language query using at least one sequence-to-sequence (seq2seq) model.

7. The computer-implemented method of claim 1, wherein generating the at least one query in the predetermined query language comprises:
generating at least one SparQL query, with one or more placeholders for at least one of one or more entities and one or more relations, by processing the at least one natural language query using one or more natural language processing techniques; and
filling the one or more placeholders using at least one knowledge graph embedding model, wherein the at least one knowledge graph embedding model is trained to map one or more entities and one or more relations from one or more enterprise-related knowledge graphs into at least one continuous vector space.

8. The computer-implemented method of claim 1, wherein generating the second set of results comprises processing the at least one natural language query using at least one large language model.

9. A non-transitory processor-readable storage medium having stored therein program code of one or more software programs, wherein the program code when executed by at least one processing device causes the at least one processing device:
to generate at least one query in a predetermined query language by processing at least one natural language query of at least one user of an enterprise;
to generate a first set of results by processing the at least one query in the predetermined query language using one or more data sources including at least one enterprise-related knowledge graph;
to generate a second set of results by processing the at least one natural language query using one or more artificial intelligence techniques;
to generate a third set of results by incorporating at least a portion of the first set of results into at least a portion of the second set of results, wherein generating the third set of results comprises extending an architecture of the one or more artificial intelligence techniques by:
integrating at least one external memory network and one or more attention mechanisms into the one or more artificial intelligence techniques, wherein the at least one external memory network comprises at least one enterprise-specific knowledge base that stores structured data from the at least one enterprise-related knowledge graph;
configuring the at least one external memory network to use at least a portion of the one or more attention mechanisms to read from and write to memory; and configuring the one or more artificial intelligence techniques to selectively access information, associated with the use of the at least a portion of the one or more attention mechanisms, in the at least one external memory network; and to perform one or more automated actions based at least in part on at least a portion of the third set of results, wherein performing one or more automated actions comprises automatically training at least a portion of the one or more artificial intelligence techniques using at least a portion of the third set of results and feedback related to the third set of results.

10. The non-transitory processor-readable storage medium of claim 9, wherein generating the third set of results comprises augmenting at least a portion of the first set of results, generated by processing at least one SparQL query using data associated with the at least one enterprise-related knowledge graph, with at least a portion of the second set of results, generated by processing the at least one natural language query using at least one large language model, and results from at least one semantic search operation.

11. The non-transitory processor-readable storage medium of claim 9, wherein generating the second set of results comprises processing the at least one natural language query using at least one large language model.

12. The non-transitory processor-readable storage medium of claim 9, wherein the one or more artificial intelligence techniques comprise at least one pretrained large language model, and wherein the computer-implemented method further comprises:
fine-tuning the at least one pretrained large language model using data specific to at least one ontology of the enterprise.

13. The non-transitory processor-readable storage medium of claim 9, wherein generating the at least one query in the predetermined query language comprises:
generating at least one SparQL query, with one or more placeholders for at least one of one or more entities and one or more relations, by processing the at least one natural language query using one or more natural language processing techniques; and
filling the one or more placeholders using at least one knowledge graph embedding model, wherein the at least one knowledge graph embedding model is trained to map one or more entities and one or more relations from one or more enterprise-related knowledge graphs into at least one continuous vector space.

14. An apparatus comprising:
at least one processing device comprising a processor coupled to a memory;
the at least one processing device being configured:
to generate at least one query in a predetermined query language by processing at least one natural language query of at least one user of an enterprise;
to generate a first set of results by processing the at least one query in the predetermined query language using one or more data sources including at least one enterprise-related knowledge graph;
to generate a second set of results by processing the at least one natural language query using one or more artificial intelligence techniques;
to generate a third set of results by incorporating at least a portion of the first set of results into at least a portion of the second set of results, wherein generating the third set of results comprises extending an architecture of the one or more artificial intelligence techniques by:
integrating at least one external memory network and one or more attention mechanisms into the one or more artificial intelligence techniques, wherein the at least one external memory network comprises at least one enterprise-specific knowledge base that stores structured data from the at least one enterprise-related knowledge graph;
configuring the at least one external memory network to use at least a portion of the one or more attention mechanisms to read from and write to memory; and
configuring the one or more artificial intelligence techniques to selectively access information, associated with the use of the at least a portion of the one or more attention mechanisms, in the at least one external memory network; and
to perform one or more automated actions based at least in part on at least a portion of the third set of results, wherein performing one or more automated actions comprises automatically training at least a portion of the one or more artificial intelligence techniques using at least a portion of the third set of results and feedback related to the third set of results.

15. The apparatus of claim 14, wherein generating the third set of results comprises augmenting at least a portion of the first set of results, generated by processing at least one SparQL query using data associated with the at least one enterprise-related knowledge graph, with at least a portion of the second set of results, generated by processing the at least one natural language query using at least one large language model, and results from at least one semantic search operation.

16. The apparatus of claim 14, wherein performing one or more automated actions comprises automatically outputting the third set of results to the at least one user via at least one interface.

17. The apparatus of claim 14, wherein generating the at least one query in the predetermined query language comprises:
generating at least one SparQL query, with one or more placeholders for at least one of one or more entities and one or more relations, by processing the at least one natural language query using one or more natural language processing techniques; and
filling the one or more placeholders using at least one knowledge graph embedding model, wherein the at least one knowledge graph embedding model is trained to map one or more entities and one or more relations from one or more enterprise-related knowledge graphs into at least one continuous vector space.

18. The apparatus of claim 14, wherein generating the second set of results comprises processing the at least one natural language query using at least one large language model.

19. The apparatus of claim 14, wherein the one or more artificial intelligence techniques comprise at least one pretrained large language model, and wherein the computer-implemented method further comprises:
fine-tuning the at least one pretrained large language model using data specific to at least one ontology of the enterprise.

20. The apparatus of claim 14, wherein generating the at least one query in the predetermined query language comprises processing the at least one natural language query using one or more natural language processing techniques.

* * * * *